DANIEL MILLER.

Bread Toaster.

No. 124,605.  Patented March 12, 1872.

Witnesses.
C. F. Brown
S. J. Noyes

Inventor.
Daniel Miller
by H. W. Beadles
Atty.

124,605

UNITED STATES PATENT OFFICE.

DANIEL MILLER, OF MARIETTA, OHIO, ASSIGNOR TO HIMSELF AND JACOB MILLER, OF SAME PLACE.

IMPROVEMENT IN BREAD-TOASTERS.

Specification forming part of Letters Patent No. 124,605, dated March 12, 1872.

SPECIFICATION.

*To all whom it may concern:*

Be it known that I, DANIEL MILLER, of Marietta, in the county of Washington and State of Ohio, have invented a new and useful Improvement in Bread-Toaster; and I do hereby declare that the following is a full and exact description of the same, reference being had to the accompanying drawing and to the letters of reference marked thereon.

This invention has for its object the production of a cheap and simple device for holding slices of bread while being toasted; and it consists in certain details of construction, which will be fully described hereinafter.

Figure 1:
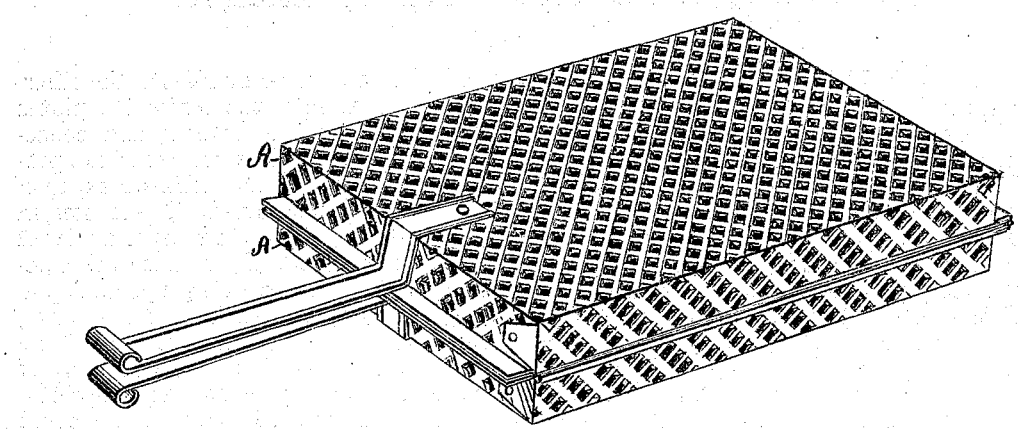
Figure 2:
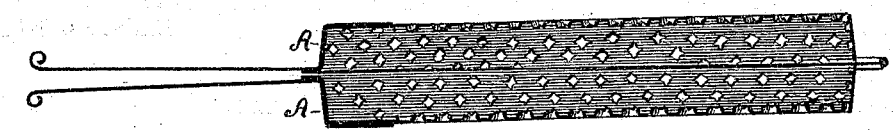

In the drawing, Figure 1 represents a perspective view of my improved toaster; and Fig. 2, a longitudinal sectional elevation.

To enable others skilled in the art to make and use my invention, I will now proceed to describe fully its construction and manner of operation.

A A represent the main parts of the toaster, which are alike in their general construction, and consist of suitable pieces of perforated sheet metal cut at the corners and bent into box-like form, as shown. These parts are hinged at one end in any suitable manner and provided with any proper handles at the other. The smooth surfaces of the perforated plates form the outside of the toaster, and consequently the inside surfaces consist of the projecting points formed by the perforations, upon which the bread is supported. The toaster, in size and shape, is adapted to receive a slice of bread of the usual size. By means of this peculiar construction the bread is supported upon points above the main surface of the metal, and consequently is less liable to burn if the toaster is placed directly upon the stove. If desired, the toaster may be made of wire cloth.

The device can be produced at a very small cost, and it is well adapted for the purpose for which it is intended.

Having thus fully described my invention, what I claim as new, and desire to secure by Letters Patent, is—

The toaster described, consisting of the parts A A of perforated sheet metal, provided with hinges and handles, as set forth.

This specification signed and witnessed this 17th day of January, 1872.

DANIEL MILLER.

Witnesses:
 JAMES WHITE,
 E. B. READ.